United States Patent
Cai et al.

(10) Patent No.: US 11,786,077 B2
(45) Date of Patent: Oct. 17, 2023

(54) FOOD PROCESSOR AND FOOD PROCESSING METHOD

(71) Applicant: KONINKLIJKE PHILIPS N.V., Eindhoven (NL)

(72) Inventors: Zhenzhen Cai, Shanghai (CN); Tao Kong, Shanghai (CN); Cong Tian, Shanghai (CN); Jingwei Tan, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 336 days.

(21) Appl. No.: 17/284,486

(22) PCT Filed: Nov. 8, 2019

(86) PCT No.: PCT/EP2019/080763
§ 371 (c)(1),
(2) Date: Apr. 12, 2021

(87) PCT Pub. No.: WO2020/099278
PCT Pub. Date: May 22, 2020

(65) Prior Publication Data
US 2021/0369054 A1    Dec. 2, 2021

(30) Foreign Application Priority Data

Nov. 12, 2018 (WO) ................ PCT/CN2018/115034
Jan. 11, 2019 (EP) ..................................... 19151413

(51) Int. Cl.
*A47J 43/07* (2006.01)
*A23L 33/00* (2016.01)
(Continued)

(52) U.S. Cl.
CPC ............. *A47J 43/0716* (2013.01); *A23L 5/13* (2016.08); *A23L 33/40* (2016.08); *A47J 27/04* (2013.01);
(Continued)

(58) Field of Classification Search
CPC ...... A47J 27/04; A47J 2027/043; A47J 43/04; A47J 43/046; A47J 43/0716;
(Continued)

(56) References Cited

U.S. PATENT DOCUMENTS 1,906,054 A * 4/1933 Freese ................... A47J 19/027
99/512
2,548,812 A * 4/1951 Patterson ............... A47J 43/145
210/256
(Continued)

FOREIGN PATENT DOCUMENTS

CN    204797648 U  * 11/2015
CN    107647808     2/2018
(Continued)

OTHER PUBLICATIONS

International Search Report and Written Opinion dated Dec. 5, 2019 for International Application No. PCT/EP2019/080763 Filed Nov. 8, 2019.

*Primary Examiner* — Drew E Becker
*Assistant Examiner* — Austin Parker Taylor

(57) ABSTRACT

A food processor combines steaming of food on a support, and blending. The support is rotated about the same shaft as the blender blade, to release the food on the support centrifugally so that it drops to the blender blade. This enables an automated process with optimized steaming and blending.

15 Claims, 2 Drawing Sheets

(51) Int. Cl.
    *A47J 27/04*   (2006.01)
    *A47J 43/046*  (2006.01)
    *A47J 43/08*   (2006.01)
    *B01F 35/75*   (2022.01)
    *B01F 29/00*   (2022.01)
    *A23L 5/10*    (2016.01)
    *B01F 101/06*  (2022.01)

(52) U.S. Cl.
    CPC ......... *A47J 43/046* (2013.01); *A47J 43/0722* (2013.01); *A47J 43/085* (2013.01); *B01F 29/00* (2022.01); *B01F 35/753* (2022.01); *A23V 2002/00* (2013.01); *A47J 2027/043* (2013.01); *B01F 2101/06* (2022.01)

(58) Field of Classification Search
    CPC ...... A47J 43/0722; A47J 43/08; A47J 43/085; A23L 33/40; A23L 5/13; B01F 29/00; B01F 29/4032; B01F 29/4036; B01F 29/40362; B01F 29/80; B01F 35/75; B01F 35/753; B01F 35/7415; B01F 35/7542; B01F 2101/06; B01F 2101/1805
    USPC ................ 426/511; 366/144, 147, 187, 188; 99/537
    See application file for complete search history.

(56) References Cited

U.S. PATENT DOCUMENTS

| | | | | |
|---|---|---|---|---|
| 4,236,541 | A | * | 12/1980 | Cipriani ................. A23N 12/02 134/140 |
| 6,505,545 | B2 | | 1/2003 | Kennedy |
| 2003/0052206 | A1 | * | 3/2003 | Fouquet ................. A47J 19/027 99/511 |
| 2013/0233181 | A1 | | 9/2013 | Allen |
| 2014/0305321 | A1 | * | 10/2014 | Zhou ....................... A47J 27/04 99/448 |
| 2017/0258256 | A1 | * | 9/2017 | Picozza ................. A47J 19/027 |
| 2018/0014683 | A1 | * | 1/2018 | Glucksman ........... A47J 43/046 |
| 2019/0117005 | A1 | * | 4/2019 | Kettavong ........... A47J 43/046 |

FOREIGN PATENT DOCUMENTS

| | | |
|---|---|---|
| CN | 107713824 | 2/2018 |
| EP | 2163178 | 3/2010 |
| EP | 2777450 | 9/2014 |
| FR | 2969911 | 7/2012 |
| FR | 2998773 | 6/2014 |
| WO | 2001/074174 | 10/2001 |
| WO | 2005094648 | 10/2005 |
| WO | 2016/096445 | 6/2016 |

* cited by examiner

FOOD PROCESSOR AND FOOD PROCESSING METHOD

CROSS REFERENCE TO RELATED APPLICATIONS

This application is the U.S. National Phase application under 35 U.S.C. § 371 of International Application No. PCT/EP2019/080763 filed Nov. 8, 2019, which claims the benefit of European Patent Application Number 19151413.2 filed Jan. 11, 2019 and Application Number PCT/CN2018/115034 filed Nov. 12, 2018. These applications are hereby incorporated by reference herein.

FIELD OF THE INVENTION

This invention relates to a food processor, which in particular is able to steam and blend food in a single vessel, for example for making baby food.

BACKGROUND OF THE INVENTION

It is well known to feed babies blended steamed vegetables or fruit.

Food processors are known for making baby food, which are designed to perform both steaming and blending.

WO 2001/074174 discloses a method and system for processing food in which a blending blade is designed to support food during steaming (with the blade stationary) and then to blend the food when the steaming is complete. Food processing systems which operate according to this principle are commercially available.

A problem with this design is that the food must be steamed at the location of the blade. If the blade is too low, the food may be dipped in water during the steaming step. If the blade is too high, part of the food remains uncut at the bottom of the vessel during the blending step, particularly when the quantity of processed food is very small. This is a particular issue for baby food, where often the quantity of food to be prepared may be very small.

The blade area needs to be large in this design due to the need to support the food during steaming. This increases the amount of food adhered to the blade and the cleaning burden of the blade. The design also does not hold small sizes of cut food well as the food can slip between the blades.

CN 107647808 discloses an alternative in which a food basket is mounted well above a blending blade. The basket is turned upside down manually to tip the steamed food onto the blender blade. Thus, this does not enable an automated process but instead requires user intervention.

There remains a need for a food processor which is able to steam and blend food in an automated way, and in which both the steaming and blending functions may be optimized. However, it is also desired not to complicate the design of the food processor, so that costs can remain low.

SUMMARY OF THE INVENTION

The invention is defined by the claims.

According to examples in accordance with an aspect of the invention, there is provided a food processor, comprising:
  a vessel for receiving food to be steamed and blended;
  a steaming system for delivering steam to the vessel for steaming the food;
  a support for retaining the food above a base of the vessel during steaming;
  a blender blade at the base of the vessel; and
  a drive arrangement for rotating the blender blade and the support about a common axis, for rotating the support to release the retained food and for rotating the blender blade to blend the released food.

This food processor provides steaming and blending in the same vessel. The food is supported above the base of the vessel during steaming so that contact with water which may collect at the base of the vessel can be avoided during steaming. In particular, because the food is released from the support before blending, the support can be located at any desired height up the vessel to provide optimum steaming conditions. The release is achieved by rotating the support. This accelerates the food (which frictionally engages with the support) and causes the food to be displaced outwardly by centrifugal forces, so that the food falls off the support. This does not need the vessel to be opened or need any physical contact from a user with the support or the food. The same drive arrangement which rotates the support is used to drive the blender blade. Thus, there is shared hardware to perform the different functions and user intervention is kept to a minimum.

The blender blade can be designed only taking account of the required blending function. It may be small to simplify cleaning.

The food processor is able to process any quantity of food (up to a maximum when the support is fully loaded). By enabling an automated process, the processing time can be reduced.

During blending, the underside of the support acts as a lid and thereby contains the blended food better at the base of the vessel. This simplifies the cleaning of the food processor.

The common axis preferably extends parallel to a top-to-bottom direction of the vessel.

Thus, the support and blender blade rotated about a vertical axis in use. The food is released radially outwardly and then drops under gravity to the base of the vessel.

The support may comprise a dish having steam openings.

The steam openings are at least in a base of the dish, to allow rising steam to flow past the food.

The dish preferably has an outer rim which is spaced from an inner wall of the vessel.

This spacing allows the food to drop to the base of the vessel after it has been released from the support. The food processor is designed for steaming and blending food cut to a certain maximum size (e.g. a cube of 1 cm sides), and the spacing is then preferably greater than that maximum size.

The outer rim may comprise one or more notches. These notches provide regions where larger food items may escape from the support.

The support is for example located at least 3 cm above the base of the vessel and the blender blade is located less than 1 cm above the base of the vessel.

The freedom to choose the height of the support and the blender blade enables each function to be optimized. A minimum 3 cm spacing keeps the food spaced from liquid at the base during steaming, and the maximum 1 cm blade height ensures effective blending close to the bottom of the vessel. It means a small blender blade may be used.

The drive arrangement may comprise a motor and a drive shaft arrangement, wherein the support and the blender blade are coupled to the drive shaft arrangement such that they rotate with the drive shaft arrangement.

There is thus a shared drive shaft arrangement. It could comprise two concentric shafts with the same common central axis. In that way, the support and the blender blade could be controlled independently.

However, in a preferred example, the drive shaft arrangement comprises a single drive shaft for rotating both the support and the blender blade simultaneously.

This provides a simplest implementation, with the support and blender blade coupled to the same shaft. Thus, they cannot be controlled independently, but the hardware requirements are reduced.

The support and blender blade may rotate at the same speed in a most simple implementation, with both directly coupled to the single drive shaft. However, there may instead by a gearing system for rotating the support and the blender blade at different rotational speeds. This enables the speeds to be different. In particular, a lower rotational speed is sufficient for the food release step compared to the speed desired for blending.

The food processor may comprise a controller which is adapted to:

control the steaming system to deliver steam to the vessel during a steaming step;

control the drive arrangement to rotate the support with a first rotational speed during a step of transferring the food from the support to the base of the vessel; and control the drive arrangement to rotate the blender blade with a second rotational speed during a blending step, wherein the second rotational speed may be the same as or higher than the first rotational speed.

When a gearing system is used, a drive shaft of the drive arrangement may be driven at a constant speed to achieve the first and second rotational speeds. When no gearing system is used, the drive shaft rotational speed may be controlled over time, with a lower speed for the release of food followed by a higher speed for blending. When the higher speed is used, the food has already been released from the support, so the support is rotationally balanced and can be rotated at the higher speed without introducing vibrations. The support preferably has a low weight if it is to be rotated at the same speed as the blender blade.

The controller may be adapted to implement the control steps as an automated cycle.

Thus, the user may simply need to set the food processor to a particular mode for the full steaming and blending to be performed. As an alternative, a user command may be provided to progress from the steaming step to the release/blending steps.

The food processor may further comprise a base unit that houses the steaming system, wherein the vessel is detachably coupled to the base unit. The vessel is thus removable for cleaning and for more convenient removal of the blended food.

The invention also provides a food processing method, comprising:

steaming food in a vessel, while the food is retained by a support above a base of the vessel;

rotating the support about a rotation axis to release the retained food so that it falls to the base of the vessel; and rotating a blender blade at the base of the vessel about the same rotation axis to blend the released food.

This is the method implemented by the food processor defined above.

The method may comprise rotating both the support and the blender blade simultaneously. The method may be implemented as an automated cycle.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
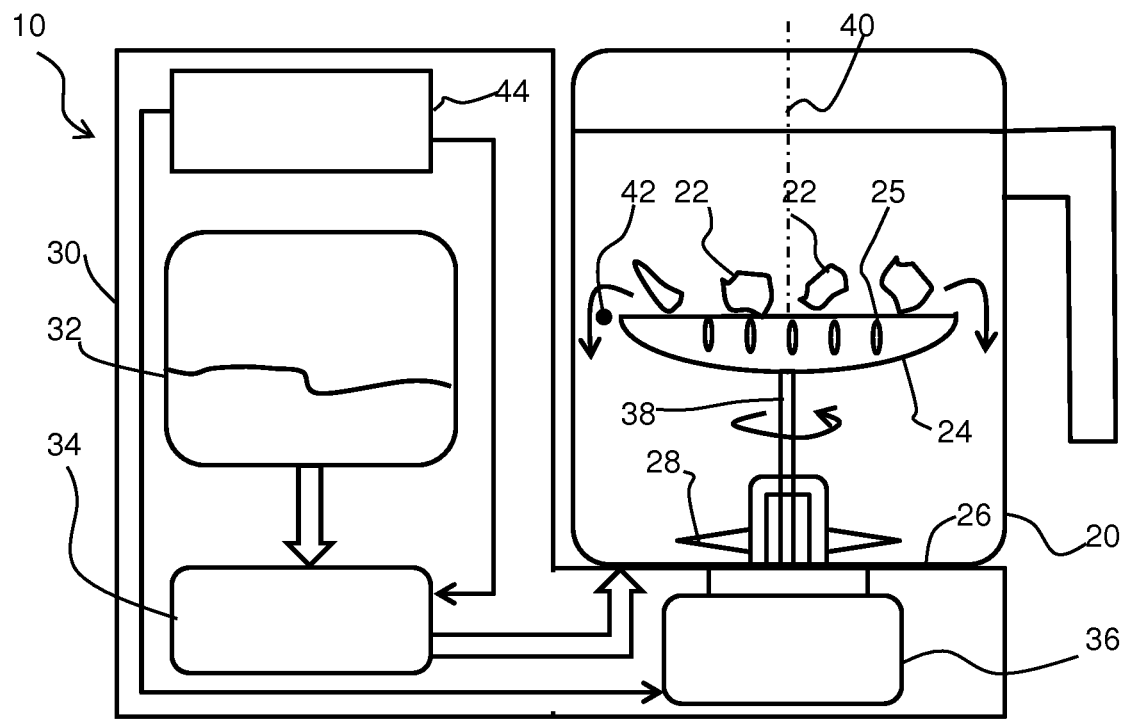
FIG. 1 shows a food processor.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a food processor which combines steaming of food on a support, and blending. The support is rotated about the same shaft as the blender blade, to release the food on the support centrifugally, so that it drops to the blender blade. This enables an automated process with optimized steaming and blending.

FIG. 1 shows a food processor 10 comprising a vessel 20 for receiving food 22 to be steamed and blended and a base unit 30.

The base unit 30 has a steaming system for delivering steam to the vessel 20 for steaming the food. The steaming system comprises a water reservoir 32 and a heater 34, such as an in-line water heater.

The base unit 30 further comprises a drive arrangement comprising a motor 36 for driving a shaft arrangement 38 in the vessel 20.

The vessel 20 houses a support 24 for retaining the food 22 above a base 26 of the vessel 20 during steaming. The support 24 comprises a dish having steam openings 25. The dish is concave (when viewed from above) so it has a raised rim relative to its bottom, for retaining food. The steam openings 25 allow steam to flow to the food.

The support has a low weight to enable it to be rotated with a low power motor. It may be plastic or formed of a paper-based material.

A blender blade 28 is at the base 26 of the vessel 20.

The support 24 and the blender blade 28 are rotationally coupled to the shaft arrangement 38 so that they are rotated about a common vertical axis 40, i.e. an axis which extends parallel to a top-to-bottom direction of the vessel 20.

The rotation of the support 24 causes the food 22 carried on the support to be released, because it is spun off the support radially outwardly. It then drops down a gap 42 between an outer rim of the support 22 and an inner wall of the vessel 20. The food processor is designed for steaming and blending food cut to a certain maximum size (e.g. a cube of 1 cm sides), and the gap 42 is large enough to allow the food to pass. For example, a gap of 1.732 cm (the main diagonal of a cube of side 1 cm) will allow all food items to pass which fit within a 1 cm cube.

The support for example has a diameter of 5 cm to 20 cm, for example 10 cm, and the gap is for example 1 cm to 3 cm. The support may be loaded with a maximum food mass which is in the range 200 g to 500 g.

The rotation of the blender blade 28 is to blend the released food.

This food processor provides steaming and blending in the same vessel 20. The food 22 is supported above the base 26 of the vessel during steaming so that contact with water which may collect at the base of the vessel can be avoided during steaming. For example, the support may be spaced from the base 26 of the vessel 20 by more than 3 cm, for example by 3 cm to 10 cm. The blender blade is designed only taking account of the required blending function. It may be small to simplify cleaning and it may have one or more cutting blades located close to the base 26 of the vessel, for example less than 1 cm, preferably less than 5 mm, above the base 26.

The food processor is thus able to process small quantities of food. The underside of the support 24 acts as a lid and thereby contains the blended food better at the base of the vessel. This simplifies the cleaning of the food processor.

The support 24, shaft arrangement 38 and the blender blade may be coupled together as a single unit. However, the support 24 is preferably removable from the shaft arrangement. This simplifies cleaning, and also enables the food processor to be used in a mode where it only functions as a blender. The shaft arrangement and the blender blade may be a single unit, or again they may be separable.

The shaft arrangement 38 is used to rotationally drive both the support 24 and the blender blade 28. There may be a single shaft, to which both are directly coupled. This provides the simplest arrangement, with the support and the blender blade rotating at the same (angular) speed.

However, the blending process requires a greater speed than is needed to eject the food from the support. A preferred rotational speed for ejecting the food is for example in the range 100 rpm to 500 rpm, whereas a preferred blending speed is for example greater than 1000 rpm, for example greater than 2000 rpm and typically in the range 4000 to 5000 rpm.

The high rotational speeds for blending may not be preferred for driving the support to remove the food, because of the rotational imbalance caused by the food before it has been released. Thus, it may be desirable to rotate at a lower speed until the food is released, and only then allow the support to rotate at the faster blender speed. This slow speed rotation may only need to last for a few seconds. This is only an option, and it may also be possible to rotate the support at the high blender blade speed to release the food, if a simple single-speed control approach is desired.

While it is possible to have the blender blades and support rotate at the same speed, an alternative is to provide gearing between the rotation of the blender blade and the support. They may still rotate simultaneously, but with a ratio between their speeds. For example, the blender blades may rotate 10 to 100 times faster than the support.

A further alternative is for the shaft arrangement to have two concentric shafts so that the rotation of the support may be controlled independently of the rotation of the blender blade. The same motor may be used, but a coupling unit may the allow selection of which shaft is rotated.

Figure 2:
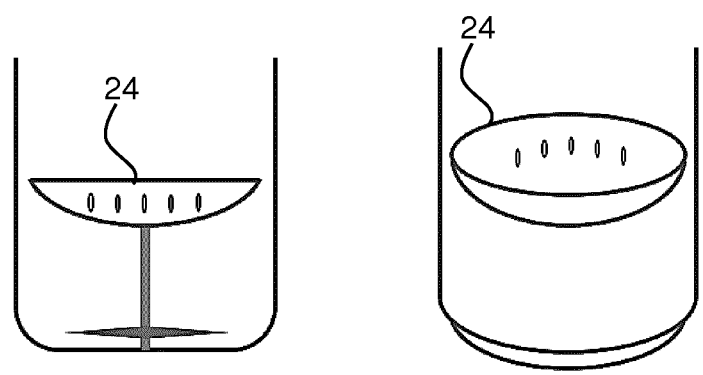
FIG. 2 shows a first example of a food support used in the food processor of FIG. 1.

FIG. 2 shows a first design of the support 24. It comprises a concave dish with a bottom and a raised rim.

Figure 3:
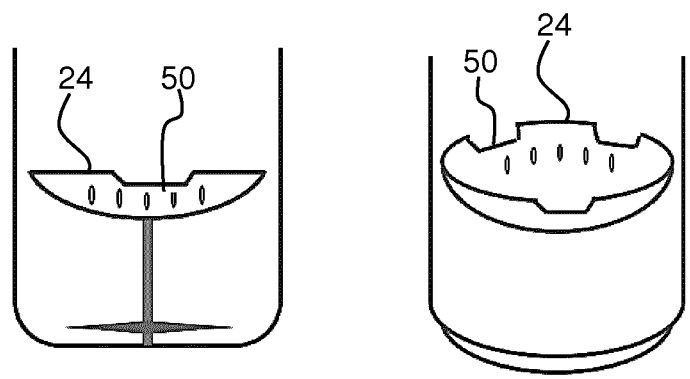
FIG. 3 shows a second example of a food support used in the food processor of FIG. 1.

FIG. 3 shows a second design of the support 24. It comprises a concave dish with a bottom and a raised rim but additionally has a set of notches 50 around the rim. These notches provide regions where larger food items may escape from the support. They may allow the rest of the rim to be closer to the inner wall of the vessel.

The food processing method is controlled by a controller 44 shown in FIG. 1. It may have various settings for various food types. Each setting defines a particular steaming time during which the steaming system is controlled to deliver steam to the vessel.

The drive arrangement is then controlled to rotate the support 24 with a first rotational speed during a step of transferring the food from the support to the base of the vessel. This step may have a duration in the range 3 to 10 seconds.

The drive arrangement is then controlled to rotate the blender blade with a second, rotational speed during a blending step, which second rotational speed may be the same as or larger than the first rotational speed.

As explained above, if a gearing system is used, the motor may be driven at a single speed to achieve different first and second rotational speeds. When no gearing system is used, the drive shaft rotational speed may be controlled over time, with a lower speed for the release of food followed by a higher speed for blending. Alternatively, a single speed may be used which is the same for the support and the blender blade. The steps are performed in an automated cycle so the user only needs to instruct the start of the process.

A user may however be able to manually end the steaming if desired to progress from the steaming step to the release/blending steps.

The steaming process typically has a duration of 5 to 15 minutes, and the blending process typically has a duration of 15 seconds to 2 minutes. Of course, these durations will depend on the food being steamed and blended and user preferences settings.

Figure 4:
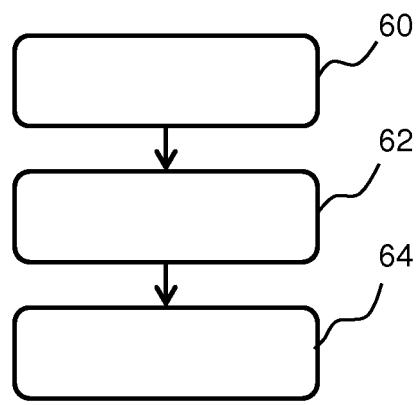
FIG. 4 shows a food processing method.

FIG. 4 shows a food processing method, comprising:

in step 60, steaming food in a vessel, while the food is retained by a support above a base of the vessel;

in step 62, rotating the support about a rotation axis to release the retained food so that it falls to the base of the vessel; and in step 64 rotating a blender blade at the base of the vessel about the same rotation axis to blend the released food.

In the example shown, the vessel is cylindrical, so that a uniform gap is formed between the support and the inner surface of the vessel. However, the shape does not need to be a perfect cylinder. There may be areas of larger gap, where the food tends to fall to the base.

Some details of the design have not been described in detail above, as they will be apparent to those skilled in the art. For example, the mounting of the vessel on the base preferably engages with a steam outlet of the base to form a seal. The vessel is vented to allow the escape of steam, in order to prevent collection of large amounts of condensed water vapor. The rotational coupling between the output of the motor and the shaft arrangement, when the vessel is mounted on the base, may take any suitable form. The blade may have any number of individual blade elements, at one height up the shaft arrangement or at multiple heights up the shaft arrangement.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A food processor, comprising:
   a vessel for receiving food to be steamed and blended;
   a steaming system for delivering steam to the vessel for steaming the food;
   a support for retaining the food above a base of the vessel during steaming;
   a blender blade at the base of the vessel; and
   a drive arrangement for rotating the blender blade and the support about a common axis, for rotating the support to release the retained food and for rotating the blender blade to blend the released food, wherein the food processor is arranged to rotate the support about a rotation axis to release the received food so that it falls to the base of the vessel.

2. The food processor as claimed in claim 1, wherein the common axis extends parallel to a top-to-bottom direction of the vessel.

3. The food processor as claimed in claim 1, wherein the support comprises a dish having steam openings.

4. The food processor as claimed in claim 1, wherein the dish has an outer rim which is spaced from an inner wall of the vessel.

5. The food processor as claimed in claim 4, wherein the outer rim comprises one or more notches.

6. The food processor as claimed in claim 1, wherein the support is located at least 3 cm above the base of the vessel and the blender blade is located less than 1 cm above the base of the vessel.

7. The food processor as claimed in claim 1, wherein the drive arrangement comprises a motor and a drive shaft arrangement, wherein the support and the blender blade are coupled to the drive shaft arrangement.

8. The food processor as claimed in claim 7, wherein the drive shaft arrangement comprises a single drive shaft for rotating both the support and the blender blade simultaneously.

9. The food processor as claimed in claim 8, comprising a gearing system for rotating the support and the blender blade at different rotational speeds.

10. The food processor as claimed in claim 1, further comprising a controller which is adapted to:
    control the steaming system to deliver steam to the vessel during a steaming step;
    control the drive arrangement to rotate the support with a first rotational speed during a step of transferring the food from the support to the base of the vessel; and
    control the drive arrangement to rotate the blender blade with a second rotational speed during a blending step, wherein the second rotational speed may be the same as or higher than the first rotational speed.

11. The food processor as claimed in claim 10, wherein the controller is adapted to implement the control steps as an automated cycle.

12. The food processor as claimed in claim 1, further comprising a base unit that houses the steaming system, wherein the vessel is detachably coupled to the base unit.

13. A food processing method, comprising:
    steaming food in a vessel, while the food is retained by a support above a base of the vessel;
    rotating the support about a rotation axis to release the retained food so that the food falls to the base of the vessel; and
    rotating a blender blade at the base of the vessel about the same rotation axis to blend the released food.

14. The method as claimed in claim 13, comprising rotating both the support and the blender blade simultaneously.

15. The method as claimed in claim 13, implemented as an automated cycle.

* * * * *